(12) United States Patent
Liu

(10) Patent No.: US 10,701,186 B2
(45) Date of Patent: Jun. 30, 2020

(54) PROTOCOL FORMAT CONVERSION METHOD AND APPARATUS, AND INTERFACE PLATFORM

(71) Applicant: HYTERA COMMUNICATIONS CORP., LTD., Shenzhen, Guangdong (CN)

(72) Inventor: Qiang Liu, Shenzhen (CN)

(73) Assignee: HYTERA COMMUNICATIONS CORP., LTD., Shenzhen, Guangdong (CN)

( * ) Notice: Subject to any disclaimer, the term of this patent is extended or adjusted under 35 U.S.C. 154(b) by 81 days.

(21) Appl. No.: 15/768,532

(22) PCT Filed: Oct. 14, 2015

(86) PCT No.: PCT/CN2015/091912
§ 371 (c)(1),
(2) Date: Sep. 13, 2018

(87) PCT Pub. No.: WO2017/063153
PCT Pub. Date: Apr. 20, 2017

(65) Prior Publication Data
US 2019/0014195 A1    Jan. 10, 2019

(51) Int. Cl.
*H04L 29/06*    (2006.01)
*H04L 29/08*    (2006.01)
(Continued)

(52) U.S. Cl.
CPC .......... *H04L 69/08* (2013.01); *H04L 41/0813* (2013.01); *H04L 67/2823* (2013.01); *H04W 88/08* (2013.01)

(58) Field of Classification Search
None
See application file for complete search history.

(56) References Cited

U.S. PATENT DOCUMENTS

2011/0292878 A1* 12/2011 Ozawa ................. H04L 12/66
370/328

FOREIGN PATENT DOCUMENTS

CN         1668039 A      9/2005
CN       101022431 A      8/2007
(Continued)

OTHER PUBLICATIONS

International Search Report and Written Opinion from PCT/CN2015/091912 dated Jul. 4, 2016 (14 pages).
(Continued)

*Primary Examiner* — Christine T Duong
(74) *Attorney, Agent, or Firm* — Calfee, Halter & Griswold LLP

(57) ABSTRACT

Disclosed are a protocol format conversion method and apparatus, and an interface platform. The protocol format conversion method includes: receiving, by a protocol format conversion module, service data, the service data being sent by a sender according to a preset protocol format therein, and the protocol format conversion module being associated with an access point serving as the sender or a receiver; performing, by the protocol format conversion module, protocol format conversion on the service data, the protocol format conversion being performed between a standard protocol format and a preset protocol format in the associated access point; and preprocessing sending of the converted service data. According to the protocol format conversion method and apparatus and the interface platform of the present invention, complicated operating procedures for calling access points by the dispatching console and inability of mutual call among multiple access points in the prior art can be avoided.

16 Claims, 11 Drawing Sheets

(51) Int. Cl.
*H04W 88/08* (2009.01)
*H04L 12/24* (2006.01)

(56) References Cited

FOREIGN PATENT DOCUMENTS

| | | |
|---|---|---|
| CN | 201146538 Y | 11/2008 |
| CN | 101374344 A | 2/2009 |
| CN | 101867557 A | 10/2010 |
| CN | 102546827 A | 7/2012 |
| WO | 2004030434 A2 | 4/2004 |

OTHER PUBLICATIONS

Second Office Action for Chinese Patent Application No. 201510662257.8 dated Aug. 16, 2018.
Third Office Action for Chinese Patent Application No. 201510662257.8 dated Feb. 2, 2019.
Fourth Office Action for Chinese Patent Application No. 201510662257.8 dated May 28, 2019.
First Office Action for Chinese Patent Application No. 201510662257.8 dated Dec. 28, 2017.

\* cited by examiner

PROTOCOL FORMAT CONVERSION METHOD AND APPARATUS, AND INTERFACE PLATFORM

TECHNICAL FIELD

The present invention relates to the field of communications technologies, and in particular, to a protocol format conversion method and apparatus, and an interface platform.

BACKGROUND

At present, there are wireless communication systems with various protocol formats on the market. Due to the differences in protocol formats, there are different interface formats, different physical connection methods, different service parameters used in a call, different interaction processes with a dispatching console, different voice formats, or the like, among the wireless communication systems.

Therefore, during an access point call in an existing wireless communication system, not only does the dispatching console need to send corresponding service data to the access points in each wireless communication system according to the protocol format of each wireless communication system, making the operating procedures of the dispatching console be complicated, but the access points in each wireless communication system cannot call each other due to various differences in the protocol formats. In other words, secondary development issues exist in both the dispatching console and the wireless communication systems.

SUMMARY

An objective of the present invention is to provide a protocol format conversion method for solving the problems of complicated operating procedures for calling access points by the dispatching console and inability of mutual call among multiple access points in the prior art.

Another objective of the present invention is to provide a protocol format conversion apparatus for solving the problems of complicated operating procedures for calling access points by the dispatching console and inability of mutual call among multiple access points in the prior art.

Another objective of the present invention is to provide an interface platform for solving the problems of complicated operating procedures for calling access points by the dispatching console and inability of mutual call among multiple access points in the prior art.

In order to solve the above technical problems, the technical solution adopted by the present invention is as follows:

A protocol format conversion method comprises: receiving, by a protocol format conversion module, service data, the service data being sent by a sender according to a preset protocol format therein, and the protocol format conversion module being associated with an access point serving as the sender or a receiver; performing, by the protocol format conversion module, protocol format conversion on the service data, the protocol format conversion being performed between a standard protocol format and a preset protocol format in the associated access point; and preprocessing sending of the converted service data.

Further, the sender is a dispatching console, and before the step of receiving, by a protocol format conversion module, service data, the method further comprises: receiving, by a uniform interface module, the service data sent by the dispatching console according to the preset standard protocol format therein; extracting an access point type in the service data; and distributing the service data to the protocol format conversion module associated with the access point serving as the receiver according to the access point type.

Further, the receiver is any access point, and the step of preprocessing sending of the converted service data comprises: sending, by the protocol format conversion module associated with the any access point, the converted service data to the any access point, the service data being in conformity with a preset protocol format in the any access point.

Further, the sender is any access point, and before the step of receiving, by a protocol format conversion module, service data, the method further comprises: establishing a connection relation between the protocol format conversion module and the any access point, so that the protocol format conversion module is associated with the any access point; and distributing the service data to the protocol format conversion module associated with the any access point according to the connection relation.

Further, the sender is any access point, the converted service data is in conformity with the standard protocol format, and the step of preprocessing sending of the converted service data comprises: sending, by the protocol format conversion module associated with the any access point, the converted service data to a uniform interface module, so that the uniform interface module forwards the service data.

Further, the receiver is any access point that is different from the sender, and after the step of sending, by the protocol format conversion module associated with the any access point, the converted service data to a uniform interface module, so that the uniform interface module forwards the service data, the method further comprises: receiving, by the uniform interface module, the converted service data, and extracting to obtain a receiver identification from the service data; searching in access point configuration information according to the receiver identification to obtain a corresponding access point type, the access point configuration information being pre-stored in the uniform interface module after the dispatching console is powered on; and forwarding the service data to the protocol format conversion module associated with the any access point serving as the receiver according to the access point type, so that the protocol format conversion module performs protocol format conversion on the service data so as to send the re-converted service data to the receiver, the re-converted service data being in conformity with the preset protocol format in the receiver.

A protocol format conversion apparatus comprises a protocol format conversion module, wherein the protocol format conversion module comprises: a first receiving unit, configured to receive service data by the protocol format conversion module, the service data being sent by a sender according to a preset protocol format therein, and the protocol format conversion module being associated with an access point serving as the sender or a receiver; a converting unit, configured to perform protocol format conversion on the service data by the protocol format conversion module, the protocol format conversion being performed between a standard protocol format and a preset protocol format in the associated access point; and a preprocessing unit, configured to preprocess sending of the converted service data.

Further, the sender is a dispatching console, and the apparatus further comprises a uniform interface module, wherein the uniform interface module comprises: a second receiving unit, configured to receive the service data sent by the dispatching console according to the preset standard protocol format therein; an extracting unit, configured to extract an access point type in the service data; and a first distributing unit, configured to distribute the service data to the protocol format conversion module associated with the access point serving as the receiver according to the access point type.

Further, the receiver is any access point, and the preprocessing unit comprises: a first sending subunit, configured to send the converted service data to the any access point by the protocol format conversion module associated with the any access point, the service data being in conformity with a preset protocol format in the any access point.

Further, the sender is any access point, and the protocol format conversion module further comprises: an associating unit, configured to establish a connection relation between the protocol format conversion module and the any access point, so that the protocol format conversion module is associated with the any access point; and a second distributing unit, configured to distribute the service data to the protocol format conversion module associated with the any access point according to the connection relation.

Further, the sender is any access point, the converted service data is in conformity with the standard protocol format, and the preprocessing unit comprises: a second sending subunit, configured to send the converted service data to a uniform interface module by the protocol format conversion module associated with the any access point, so that the uniform interface module forwards the service data.

Further, the receiver is any access point that is different from the sender, and the uniform interface module further comprises: a third receiving unit, configured to receive the converted service data, and extract to obtain a receiver identification from the service data; a searching unit, configured to search in access point configuration information according to the receiver identification to obtain a corresponding access point type, the access point configuration information being pre-stored in the uniform interface module after the dispatching console is powered on; and a forwarding unit, configured to forward the service data to the protocol format conversion module associated with the any access point serving as the receiver according to the access point type, so that the protocol format conversion module performs protocol format conversion on the service data so as to send the re-converted service data to the receiver, the re-converted service data being in conformity with the preset protocol format in the receiver.

An interface platform comprises at least one processor, at least one communication interface, at least one communication bus, and a memory for storing program instructions, the at least one processor being configured to perform the following steps according to the program instructions: receiving, by a protocol format conversion module, service data, the service data being sent by a sender according to a preset protocol format therein, and the protocol format conversion module being associated with an access point serving as the sender or a receiver; performing, by the protocol format conversion module, protocol format conversion on the service data, the protocol format conversion being performed between a standard protocol format and a preset protocol format in the associated access point; and preprocessing sending of the converted service data.

Further, the sender is a dispatching console, and before the step of receiving, by a protocol format conversion module, service data, the processor further performs the following steps: receiving, by a uniform interface module, the service data sent by the dispatching console according to the preset standard protocol format therein; extracting an access point type in the service data; and distributing the service data to the protocol format conversion module associated with the access point serving as the receiver according to the access point type.

Further, the sender is any access point, and before the step of receiving, by a protocol format conversion module, service data, the processor further performs the following steps: establishing a connection relation between the protocol format conversion module and the any access point, so that the protocol format conversion module is associated with the any access point; and distributing the service data to the protocol format conversion module associated with the any access point according to the connection relation.

Compared with the prior art, the present invention has the following advantageous effects:

By setting the protocol format conversion module associated with the access point serving as the sender or the receiver to receive the service data sent by the sender according to the preset protocol format, the protocol format conversion is performed on the received service data between the standard protocol format and the preset protocol format in the associated access point, and the sending of the converted service data is preprocessed, so that the dispatching console, when serving as the sender, can send the service data in the uniform format according to the preset standard protocol format therein, thus reducing the complexity of the operating procedures of the dispatching console, avoiding the secondary development of the dispatching console, and reducing the development costs in the meanwhile.

In addition, the protocol format conversion is performed between the standard protocol format and the preset protocol format in the associated access point, so that the service data sent by any access point in the wireless communication system serving as the sender can be converted into the service data that is in conformity with the protocol format preset in any access point in another wireless communication system serving as the receiver through the transition of the standard protocol format, thereby realizing mutual call among multiple access points in different wireless communication systems.

DETAILED DESCRIPTION

Typical embodiments that embody the features and advantages of the present invention will be described in detail in the following description. It should be understood that the present invention may have various changes in various embodiments without departing from the scope of the present invention, and the descriptions and illustrations therein are substantially illustrative, but are not intended to limit the present invention.

Figure 1:
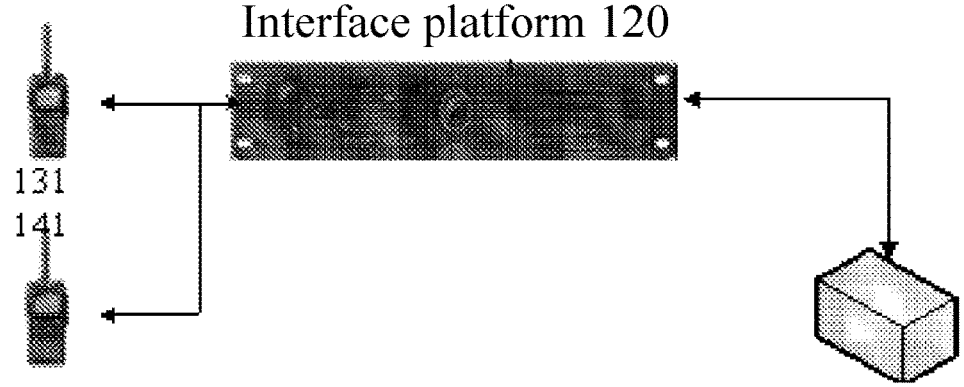
FIG. 1 is a schematic diagram of an application environment of a protocol format conversion method according to an embodiment.

FIG. 1 is a schematic diagram of an application environment of a protocol format conversion method according to an embodiment. Referring to FIG. 1, the application environment comprises a dispatching console 110, an interface platform 120, a wireless communication system 130 and any access point 131 therein, a wireless communication system 140 and any access point 141 therein. It should be noted that it is not limited to one dispatching console and one access point in the embodiment, and it is merely for convenience of illustration herein. Multiple dispatching consoles and multiple access points are also applicable in other embodiments.

As a monitoring platform, related APP application software or embedded devices may be disposed in the dispatching console 110 to implement call connecting, access point configuring and call intercepting to the any access points 131, 141 in the wireless communication systems 130, 140.

The interface platform 120 is connected between the dispatching console 110 and the wireless communication systems 130, 140, wherein a protocol format conversion module associated with an access point serving as a sender or a receiver is provided for performing the protocol format conversion between a standard protocol format and a preset protocol format in the associated access point.

The wireless communication systems 130, 140 may be HMF systems, EADS systems, DMR intercom systems, MPT intercom systems, short-wave radio station systems, and the like. For example, if the wireless communication system 130 is an HMF system, then the any access point 131 therein is an intercom; if the wireless communication system 140 is an MPT intercom system, then the any access point 141 therein is an on-vehicle intercom.

After the dispatching console 110 is powered on, the dispatching console will send service data according to a preset protocol format therein to perform protocol format conversion on the received service data through the interface platform 120 to obtain service data in conformity with the protocol format of the corresponding wireless communications system respectively, and send the service data to the corresponding wireless communication system, thereby establishing a call connection between the dispatching console and the access point 131 of the wireless communication system 130 and the access point 141 of the wireless communication system 140.

It is worth mentioning that the preset protocol format in the dispatching console 110 is a uniform protocol format. The uniform protocol format may be a standard protocol format, or may be a non-standard protocol format defined by a device manufacturer. In this embodiment, the preset protocol format in the dispatching console 110 is a standard protocol format, for example, an XML protocol.

At the same time, the dispatching console also pre-stores the access point configuration information in the interface platform 120 so as to facilitate the subsequent access point between the wireless communication systems 130, 140 to initiate a call initiatively, for example, to initiate a call to the dispatching console, or, initiate a call to each other. Afterwards, the dispatching console 110 may either turn off or keep call monitoring to the wireless communication systems 130, 140.

Certainly, in other application scenarios, for example, in an application scenario without a dispatching console, the access point configuration information will be pre-stored in the interface platform 120 through a configuration tool. The configuration tool may be in the form of a software client or a web page, so as to enable the access point to learn whether it is allowed to call an access point in a different wireless communication system.

Since the access point 131 of the wireless communication system 130 and the access point 141 of the wireless communication system 140 belong to different wireless communication systems, protocol format conversion will be performed by the interface platform 120 on the service data respectively sent by the two according to the preset protocol formats so as to obtain the service data in conformity with the protocol format of the corresponding wireless communication system respectively, and then the service data is sent to the dispatching console or the remaining access points. The mutual call between the access points will learn according to the access point configuration information that whether the dispatching console 120 allows the mutual call between the wireless communication system 130 and the wireless communication system 140; if the mutual call between the wireless communication system 130 and the wireless communication system 140 is allowed, then the mutual call between the access points can be implemented.

It should be noted that the protocol formats of the access points in the same wireless communication system are the same, mutual call between two access points can be directly initiated within the wireless communication system without through the interface platform 120, therefore, both the access point serving as the sender and the access point serving as the receiver mentioned in the present invention belong to different wireless communication systems.

Figure 2:
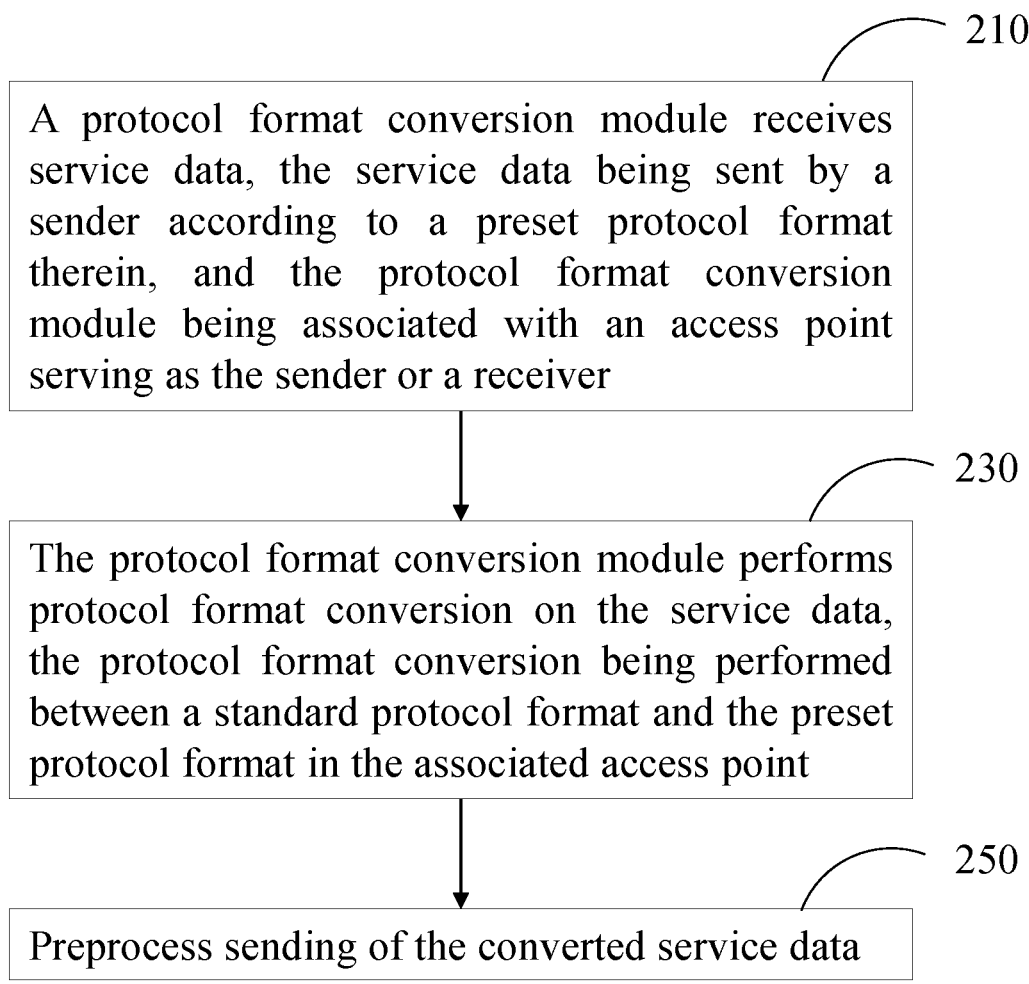
FIG. 2 is a flow chart of a protocol format conversion method according to an embodiment.

Referring to FIG. 2, in an embodiment, a protocol format conversion method comprises the following steps.

In step 210, a protocol format conversion module receives service data, the service data being sent by a sender according to a preset protocol format therein, and the protocol format conversion module being associated with an access point serving as the sender or a receiver.

The sender may be a dispatching console or any access point in a wireless communication system. Correspondingly, when the sender is the dispatching console, the receiver may be any access point in the wireless communication system. When the sender is any access point in the wireless communication system, the receiver may be a remaining access point that is different from the access point, and may also be the dispatching console.

During an access point call, various different services are performed between the sender and the receiver, for example, establishing a call, sending a short message, positioning, and the like. The data transmitted in these processes is the service data, for example, the service data may be call data, short message data, positioning data, and the like. The service data is generated according to service parameters used during the access point call. For example, the service parameters comprise an access point type, a receiver identification, a call priority, a call type, etc.

The protocol formats of the service data sent or received in different wireless communication systems are different from each other, and the protocol formats of the service data sent or received in the dispatching console are also different from that of each wireless communication system. Therefore, the sender will send the service data according to the preset protocol format therein, and the receiver will also receive the service data according to the preset protocol format therein.

Based on this, the protocol format conversion module is configured to perform protocol format conversion on the service data between the sender and the receiver. As the preset protocol formats in the dispatching console are the same during the access point call, for example, the preset protocol format is the standard protocol format, while the protocol formats of the wireless communication systems are different from each other, the protocol format conversion module may be configured to be associated with the wireless communication system, i.e., the protocol format conversion module is associated with any access point in the wireless communication system.

When the access point serves as the sender, the protocol format conversion module receives the service data sent by the access point in conformity with the preset protocol format therein. When the access point serves as the receiver, the protocol format conversion module sends the service data in conformity with the preset protocol format therein to the access point.

In step 230, the protocol format conversion module performs protocol format conversion on the service data, the protocol format conversion being performed between the standard protocol format and the preset protocol format in the associated access point.

It can be understood that the service data received at an input end of the protocol format conversion module is in conformity with the preset protocol format in the sender, and the service data sent from an output end of the protocol format conversion module is in conformity with the preset protocol format in the direct receiver by performing the protocol format conversion on the service data.

As described above, the sender may be an access point or a dispatching console. Correspondingly, the direct receiver may be a dispatching console or an access point, or may be a relay module that plays a role of forwarding, so as to forward the service data to the dispatching console or the access point through the relay module.

Further, the preset protocol formats in any access point of different associated wireless communication systems are not the same, while uniform protocol formats are preset in the dispatching console; for example, the uniform protocol format is a standard protocol format. Based on this, in order to implement the call between the dispatching console and the access point and multiple access points, the protocol format conversion is performed between the standard protocol format and the preset protocol format in the associated access point.

In step 250, sending of the converted service data is preprocessed.

As described above, since the receiver may either be any access point in the wireless communication system, or the dispatching console, before the protocol format conversion module sends the converted service data to the receiver, sending of the converted service data will be preprocessed correspondingly according to different receivers, so that the receiver receives the service data in conformity with the preset protocol format therein, thereby completing the protocol format conversion during the access point call.

Through the method as described above, when the dispatching console serves as the sender, the service data in the uniform format will be performed according to the preset protocol format therein, thus reducing the complexity of the operating procedures of the dispatching console, and avoiding the secondary development of the dispatching console. In addition, by setting the protocol format conversion module, any access points in different wireless communication systems are not limited to the different protocol formats therebetween, so that mutual call between multiple access points is realized, and the secondary development of the wireless communication system is avoided.

Since the sender may be the dispatching console or any access point in the wireless communications system, the protocol format conversion method will be described with different senders respectively in the following embodiments.

Figure 3:
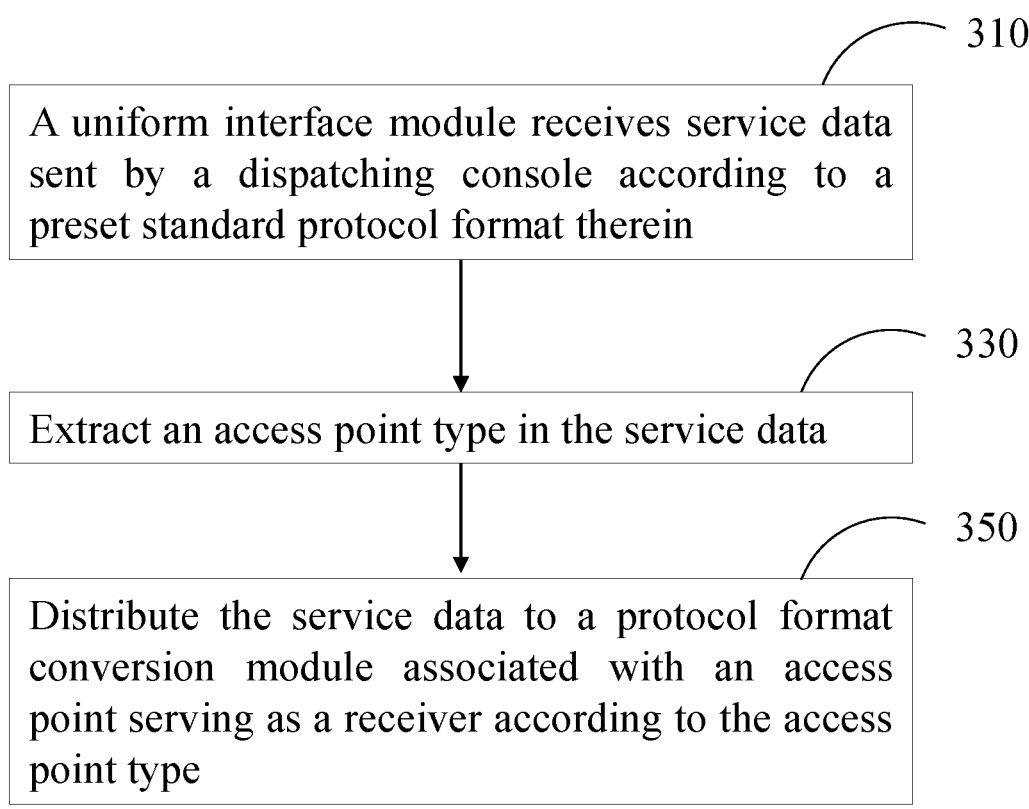
FIG. 3 is a flow chart of a protocol format conversion method according to another embodiment.

Referring to FIG. 3, in an embodiment, the sender is a dispatching console. Before step 110, the method further comprises the following step.

In step 310, a uniform interface module receives service data sent by the dispatching console according to a preset standard protocol format therein.

When the sender is the dispatching console, a receiver may be any access point in a wireless communication system. Correspondingly, multiple protocol format conversion modules associated with the access point in the wireless communication system will be preset between the sender and the receiver.

The uniform interface module is set between the dispatching console and the multiple protocol format conversion modules for receiving and distributing the service data, thereby establishing a connection relation between the dispatching console and the protocol format conversion modules associated with the access point, thus implementing the call between the dispatching console and the access point. The uniform interface module may be implemented by calling an application programming interface (API), or may be implemented by calling a hardware interface preset in a hardware device.

In the embodiment, by additionally arranging the uniform interface module between the dispatching console and the multiple protocol format conversion modules, the dispatching platform is faced with the unique uniform interface module instead of the multiple wireless communication systems with different protocol formats. In this way, all the calling characteristics of the wireless communication systems can be retained in the service data sent by the dispatching console to the uniform interface module according to the standard protocol format, so as to truly restore the inherent calling charactetistics, thereby avoiding the problem of making a group call into an ordinary call by functional weakening, i.e., discarding characteristics and only extracting commonality in the prior art.

In step 330, an access point type in the service data is extracted.

As described above, since the service data sent by the dispatching console is generated according to the service parameters used during the access point call, the access point type can be extracted from the service data. The access point type is used to identify an access point serving as the receiver, and a wireless communication system to which the corresponding access point belongs can be known through the access point type. For example, the access point type is HMF, then the corresponding access point belongs to an HMF system.

In step 350, the service data is distributed to the protocol format conversion module associated with the access point serving as the receiver according to the access point type.

As described above, there are multiple preset protocol format conversion modules, the uniform interface module can learn the protocol format conversion module associated with the access point corresponding to the access point type through the access point type obtained by extracting. Therefore, the service data is distributed to the protocol format conversion module, so that the service data distributed by the uniform interface module is converted into the preset protocol format in the access point through the protocol format conversion module.

Of course, in other embodiments, the dispatching console may also directly send the service data to each protocol format conversion module without through the uniform interface module for distribution. If no uniform interface module is set, then the receiver judges whether the received service data is valid according to the access point type carried in the service data, that is, whether the access point identified by the access point type is matched with the access point serving as the receiver; if the access point identified by the access point type is not matched with the access point serving as the receiver, then the received service data is directly discarded.

Figure 4:
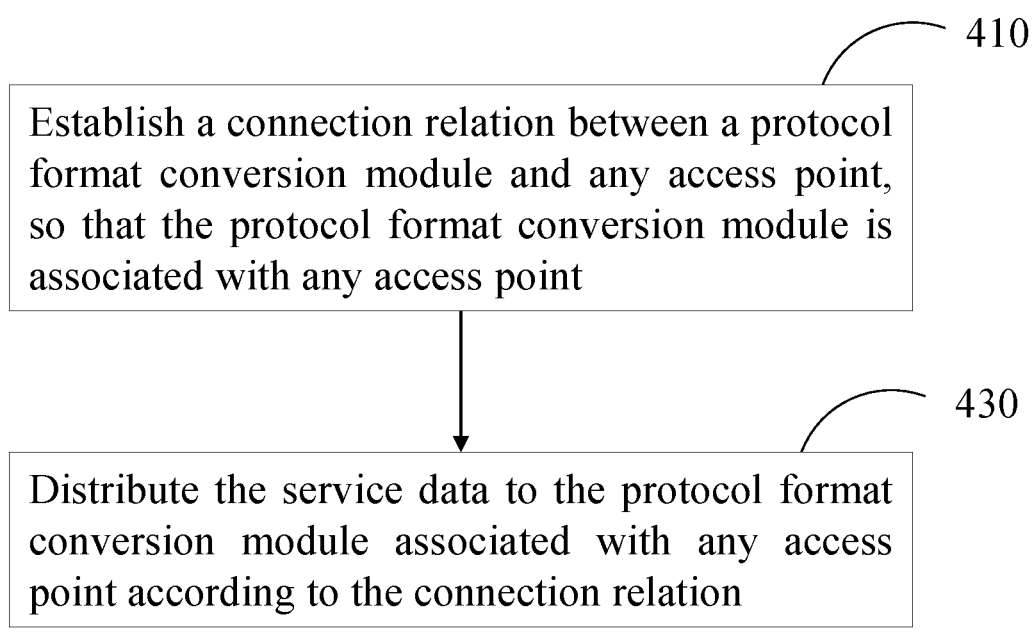
FIG. 4 is a flow chart of a protocol format conversion method according to another embodiment.

Referring to FIG. 4, in an embodiment, the sender is any access point. Before step 110, the method further comprises the following steps.

In step 410, a connection relation between the protocol format conversion module and any access point is established, so that the protocol format conversion module is associated with any access point.

As described above, multiple protocol format conversion modules associated with the access points of the wireless communication systems will be preset between the sender and the receiver.

By establishing the connection relation between the multiple preset protocol format conversion modules and the multiple access points, the multiple access points correspond to the multiple protocol format conversion modules one by one, thereby enabling the protocol format conversion module to directly receive the service data sent by the access point associated therewith according to the connection relation. Of course, in other embodiments, multiple access points and multiple protocol format conversion modules may also implement the association between the protocol format conversion module and the access point through a pre-stored lookup table, wherein the lookup table is stored with a correspondence between the access point and the protocol format conversion module, such that the access point learns the protocol format conversion module associated therewith according to the correspondence and distributes the service data.

In step 430, the service data is distributed to the protocol format conversion module associated with any access point according to the connection relation.

In an embodiment, the receiver is any access point, and step 150 comprises the followings.

The protocol format conversion module associated with any access point sends the converted service data to any access point, the service data being in conformity with a preset protocol format in any access point.

In the embodiment, the sender is a dispatching console and the receiver is any access point.

As described above, after the service data sent by the dispatching console is distributed by the uniform interface module to the protocol format conversion module associated with the any access point, the service data is converted to be in conformity with the preset protocol format in the any access point through the protocol format conversion module, and the receiver will receive the converted service data directly through the protocol conversion module associated therewith.

In an embodiment, the sender is any access point, and the converted service data is in conformity with to the standard protocol format.

At this moment, the receiver may either be the dispatching console, or any access point that is different from the sender.

When the receiver is the dispatching console, since the converted service data is in conformity with to the standard protocol format, the dispatching console can directly receive the converted service data.

When the receiver is any access point that is different from the sender, the any access point will forward the converted service data through a relay module, i.e., the uniform interface module.

Further, step 150 comprises the followings.

The protocol format conversion module associated with any access point sends the converted service data to the by uniform interface module, so that the uniform interface module forwards the service data.

Because the uniform interface module is the direct receiver of the converted service data, the protocol format conversion module firstly sends the service data converted into the standard protocol format to the uniform interface module, and then processes and forwards the converted service data to a corresponding receiver through the uniform interface module.

When the receiver is the dispatching console, since the preset protocol format in the dispatching console is the standard protocol format, the uniform interface module directly forwards the converted service data to the dispatching console.

When the receiver is any access point that is different from the sender, since the converted service data is in conformity with the standard protocol format instead of the preset protocol format in the access point, the converted service data needs to be further processed and then forwarded to the receiver.

It is worth mentioning that when the dispatching console performs call monitoring on the wireless communication system, the service data sent by any access point in the wireless communication system can be received at any time. Therefore, when the uniform interface module forwards the service data to the dispatching console, it is not necessary to judge whether the service data is sent to the dispatching console by any data extracting operation.

Figure 5:
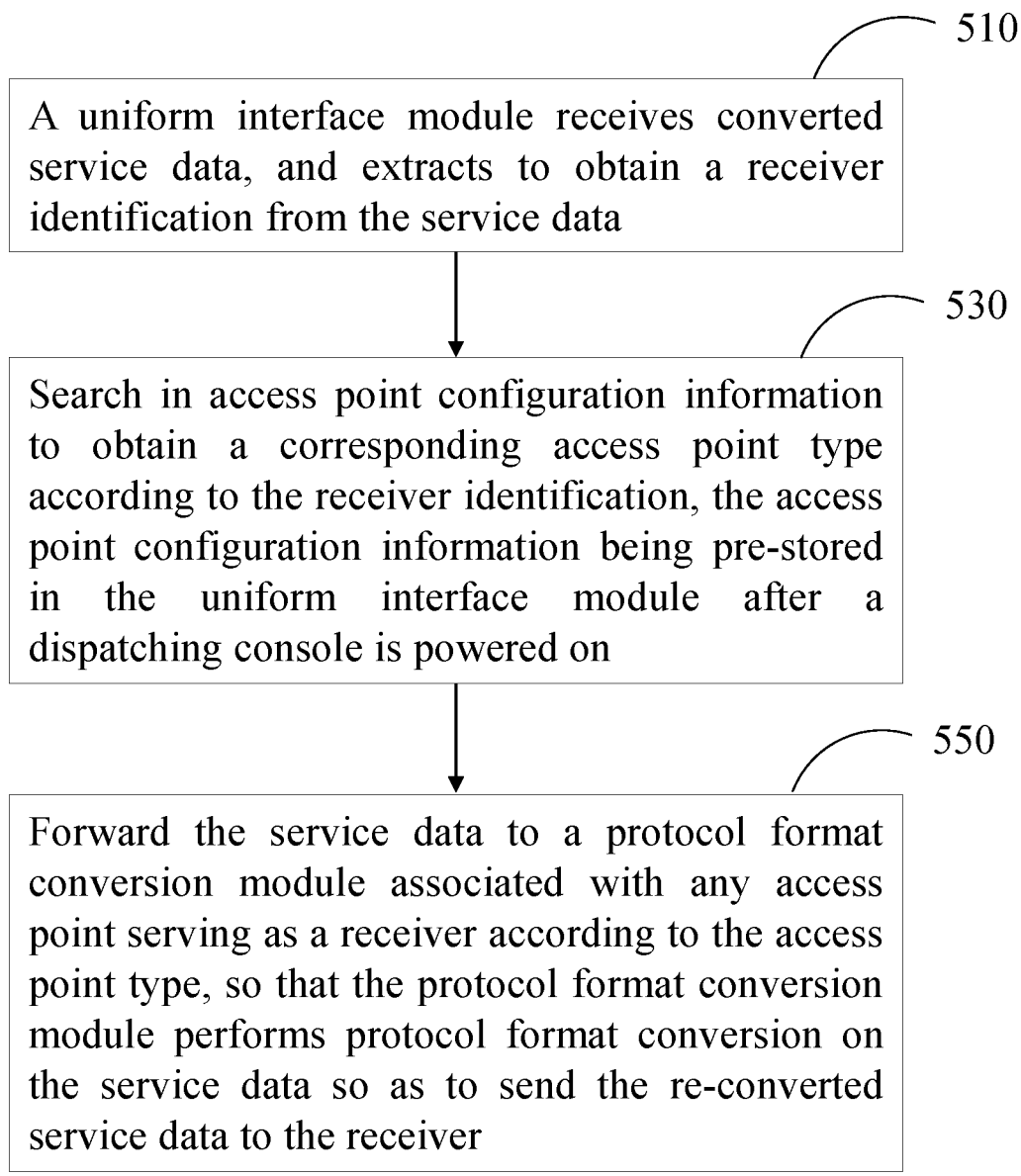
FIG. 5 is a flow chart of a protocol format conversion method according to another embodiment.

Referring to FIG. 5, in an embodiment, the receiver is any access point that is different from the sender, and after the step of sending the converted service data to the uniform interface module by the protocol format conversion module associated with the any access point, so that the uniform interface module forwards the service data, the method described above further comprises the following steps.

In step 510, the uniform interface module receives the converted service data, and extracts to obtain a receiver identification from the service data.

As described above, since the service data sent by the dispatching console is generated according to the service parameters used during the access point call, the uniform interface module can extract to obtain the receiver identification from the service data after receiving the converted service data, and the receiver identification is used to obtain the corresponding access point in the wireless communication system. The receiver identification is different in different wireless communication systems. For example, if the wireless communication system is an HMF system, then the receiver identification is a called number; if the wireless communication system is a short-wave radio station, then the receiver identification is a called frequency band.

In step 530, a corresponding access point type is searched and obtained in access point configuration information according to the receiver identification, the access point configuration information being pre-stored in the uniform interface module after the dispatching console is powered on.

As described above, the access point configuration information will be pre-stored in the uniform interface module through the dispatching console after the dispatching console is powered on, so as to learn whether the dispatching console allows mutual call among the access points belonging to different wireless communication systems. If the mutual call among the access points belonging to different wireless communication systems is allowed, then the correspondence between the receiver identification and the access point type will be stored in the pre-stored access point configuration information.

For example, as shown in FIG. 1, the receiver identification extracted and obtained from the service data sent by the access point 131 in the wireless communication system 130 is the receiver identification of the access point 141; if the corresponding access point type (showing that the access point 141 belongs to the wireless communication system 140) can be searched and obtained from the pre-stored access point configuration information according to the receiver identification of the access point 141, then it represents that mutual call between the access point 131 in the wireless communication system 130 and the access point 141 in the wireless communication system 140 can be performed; otherwise, the access point call is stopped.

After the access point type is searched, the specific corresponding access point serving as the receiver can be learnt through the cooperation of the receiver identification. For example, if the access point type is HMF and a receiving number is 001, then the specific corresponding access point is a No. 001 intercom in the HMF system.

In step 550, the service data is forwarded to the protocol format conversion module associated with any access point serving as the receiver according to the access point type, so that the protocol format conversion module performs protocol format conversion on the service data so as to send the re-converted service data to the receiver, the re-converted service data being in conformity with the preset protocol format in the receiver.

As described above, because there are multiple preset protocol format conversion modules, the uniform interface module can learn the protocol format conversion module associated with the access point corresponding to the access point type through the access point type obtained by searching, thus forwarding the converted service data to the associated protocol format conversion module.

Through the associated protocol format conversion module, the service data forwarded by the uniform interface module is converted into a preset protocol format in the access point to obtain re-converted service data. At this moment, the receiver will directly receive the re-converted service data through the protocol format conversion module associated therewith.

Figure 6:
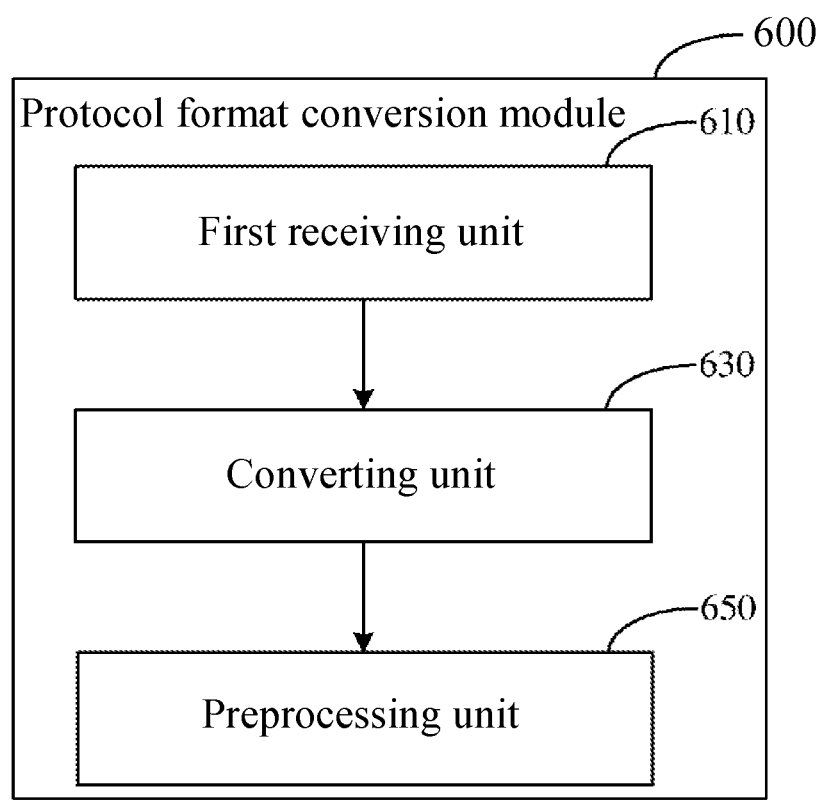
FIG. 6 is a structure diagram of a protocol format conversion apparatus according to an embodiment.

Referring to FIG. 6, in an embodiment, a protocol format conversion apparatus during an access point call comprises a protocol format conversion module 600. The protocol format conversion module 600 comprises: a first receiving unit 610, a converting unit 630, and a preprocessing unit 650.

The first receiving unit 610 is configured to receive service data, the service data being sent by a sender according to a preset protocol format therein, and the protocol format conversion module being associated with an access point serving as the sender or a receiver.

The converting unit 630 is configured to perform protocol format conversion on the service data by the protocol format conversion module, the protocol format conversion being performed between a standard protocol format and a preset protocol format in the associated access point.

The preprocessing unit 650 is configured to preprocess sending of the converted service data.

Figure 7:
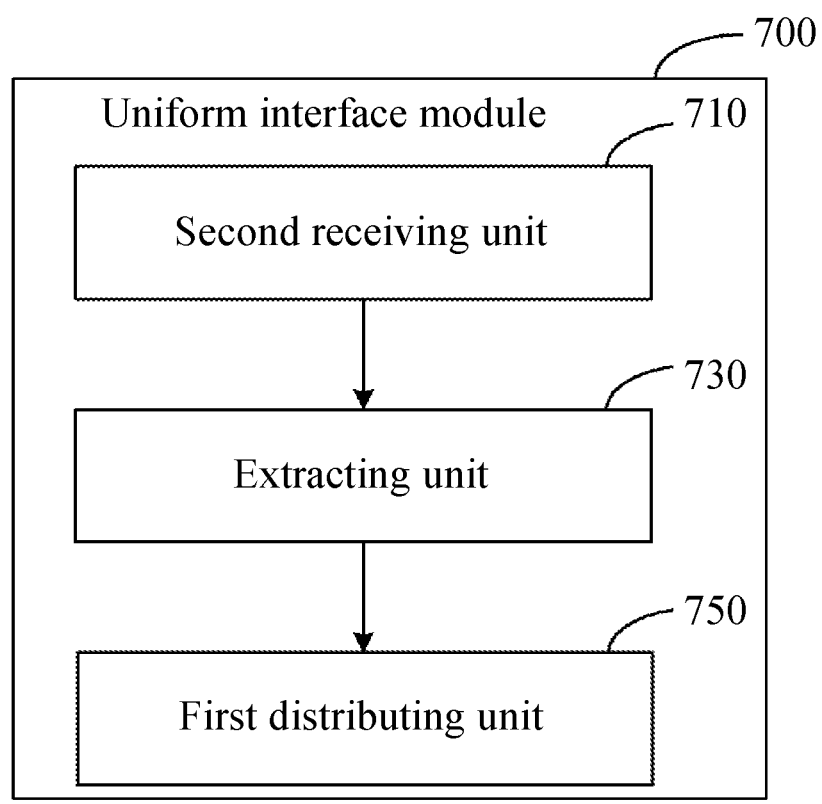
FIG. 7 is a structure diagram of a protocol format conversion apparatus according to another embodiment.

Referring to FIG. 7, in an embodiment, the sender is a dispatching console, and the apparatus above further comprises a uniform interface module 700. The uniform interface module 700 comprises: a second receiving unit 710, an extracting unit 730, and a first distributing unit 750.

The second receiving unit 710 is configured to receive the service data sent by the dispatching console according to the preset standard protocol format therein.

The extracting unit 730 is configured to extract an access point type in the service data.

The first distributing unit 750 is configured to distribute the service data to the protocol format conversion module associated with the access point, serving as the receiver according to the access point type.

Figure 8:
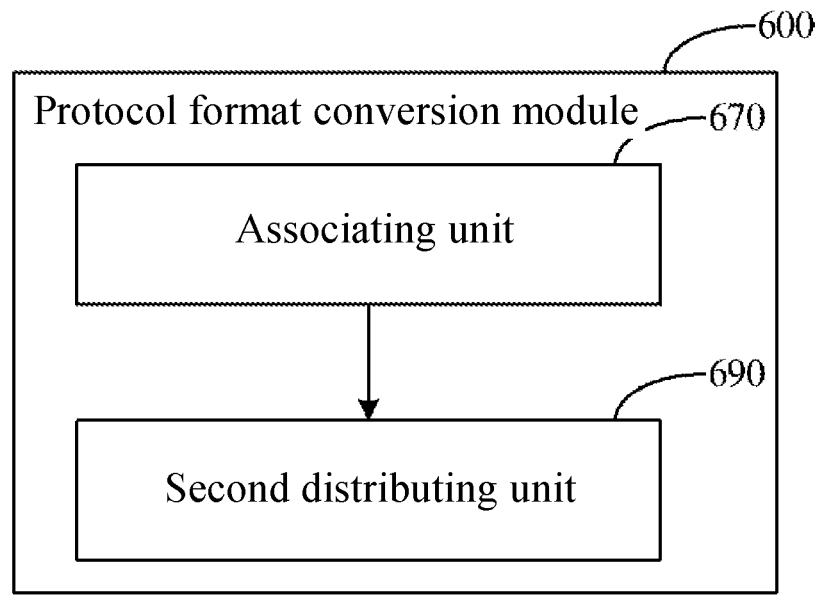
FIG. 8 is a structure diagram of a protocol format conversion apparatus according to another embodiment.

Referring to FIG. 8, in an embodiment, the sender is any access point, and the protocol format conversion module 600 further comprises: an associating unit 670 and a second distributing unit 690.

The associating unit 670 is configured to establish a connection relation between the protocol format conversion module and the any access point, so that the protocol format conversion module is associated with the any access point.

The second distributing unit 690 is configured to distribute the service data to the protocol format conversion module associated with the any access point according to the connection relation.

In one embodiment, the receiver is any access point, and the preprocessing unit 650 comprises: a first sending subunit.

The first sending subunit is configured to send the converted service data to the any access point by the protocol format conversion module associated with the any access point, the service data being in conformity with a preset protocol format in the any access point.

In an embodiment, the sender is any access point, the converted service data is in conformity with the standard protocol format, and the preprocessing unit 650 comprises: a second sending subunit.

The second sending subunit is configured to send the converted service data to a uniform interface module by the protocol format conversion module associated with the any access point, so that the uniform interface module forwards the service data.

Figure 9:
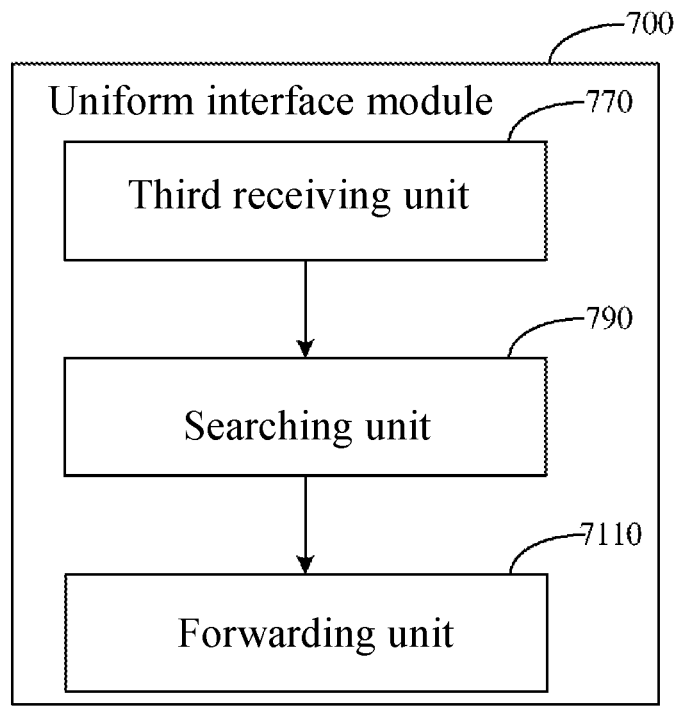
FIG. 9 is a structure diagram of a protocol format conversion apparatus according to another embodiment.

Referring to FIG. 9, in an embodiment, the receiver is any access point that is different from the sender, and the uniform interface module 700 further comprises: a third receiving unit 770, a searching unit 790, and a forwarding unit 7110.

The third receiving unit 770 is configured to receive the converted service data by the uniform interface module, and extract to obtain a receiver identification from the service data.

The searching unit 790 is configured to search in access point configuration information according to the receiver identification to obtain a corresponding access point type, the access point configuration information being pre-stored in the uniform interface module after the dispatching console is powered on.

The forwarding unit 7110 is configured to forward the service data to the protocol format conversion module associated with the any access point serving as the receiver according to the access point type, so that the protocol format conversion module performs protocol format conversion on the service data so as to send the re-converted service data to the receiver, the re-converted service data being in conformity with the preset protocol format in the receiver.

Figure 10:
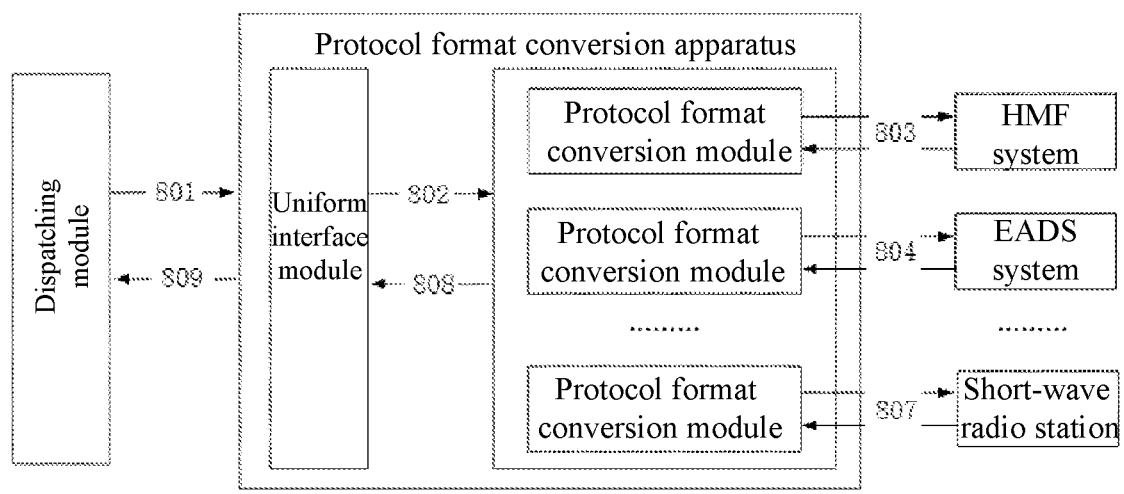
FIG. 10 is a structure diagram of a protocol format conversion apparatus according to a specific embodiment.
Figure 11:
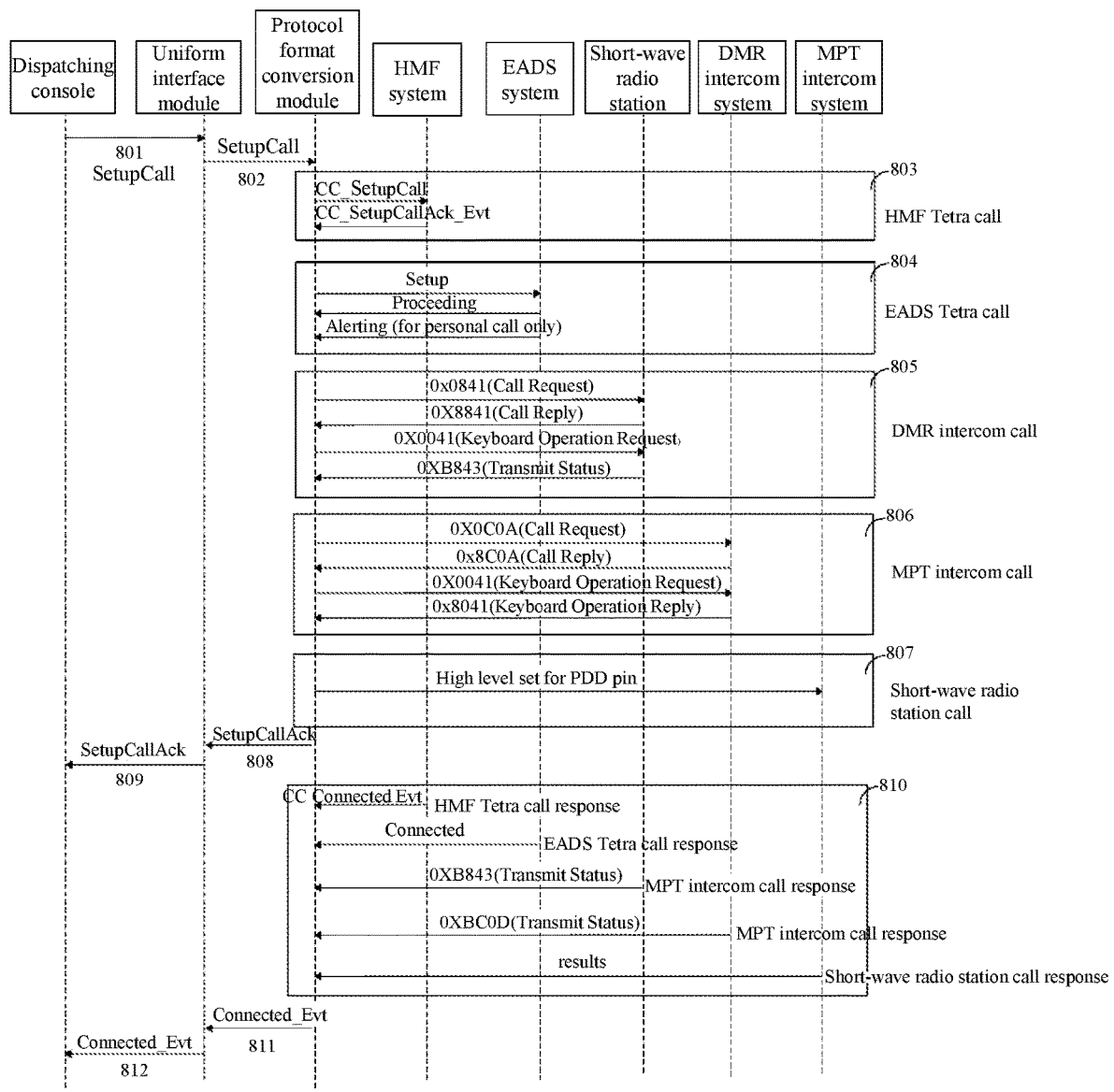
FIG. 11 is a sequence chart of a protocol format conversion method according to a specific embodiment.

In an application scenario, as shown in FIG. 10 to FIG. 11, FIG. 10 shows a structure diagram of a protocol format conversion apparatus, and FIG. 11 shows a complete interaction process of the protocol format conversion method in a specific implementation process. As an example of setting up a call connection between a dispatching console and access points in multiple wireless communication systems through an interface platform, the specific implementation process is described as follows.

The dispatching console sends the service data in conformity with the standard protocol format to the uniform interface module of the protocol format conversion apparatus by performing step 801.

The uniform interface module obtains the protocol format conversion module associated with the access point in each wireless communication system by performing step 802, thereby sending the received service data to the protocol format conversion module.

The protocol format conversion module of the protocol format conversion apparatus converts the received service data into the service data that is in conformity with the preset protocol format in the access point serving as the receiver by performing any one of steps 803 to 807, and sends the service data to the corresponding access point in each wireless communication system.

After the corresponding access point in each wireless communication system has successfully received the converted service data, step 808 and step 809 are performed in sequence by the protocol format conversion apparatus to send the service data to the dispatching console to inform the dispatching console of an acceptance result of the dispatching console about call establishing request.

If the acceptance result is that the call establishing request of the dispatching console is accepted, the corresponding access point in each wireless communication system will send the service data to the protocol format conversion apparatus by performing step 810 to inform the dispatching console that it has successfully responded to the call establishing request of the dispatching console.

The protocol format conversion module converts the received service data into the service data that is in conformity with the standard protocol format by performing step 811, and sends the service data to the uniform interface module.

The uniform interface module forwards the received service data directly to the dispatching console by performing step 812.

After the dispatching console successfully receives the service data, the call connection between the dispatching console and the access point in each wireless communication system is completed.

Through the method as described above, the dispatching console can uniformly send the service data according to the preset protocol format therein, thereby shielding the interface differences on various wireless communication systems in the prior art, and meanwhile, the interface platform is disposed between the dispatching console and each wireless communication system, so that the interaction process between the dispatching console side and each wireless communication system is uniform, i.e., the interaction process differences between various wireless communication systems in the prior art are shielded at the dispatching console side.

In addition, the setting of the interface platform also improves the scalability and compatibility of the entire call system, which not only preserves the existing cluster features, but also reduces the system dependency and decreases the development and maintenance costs.

Figure 12:
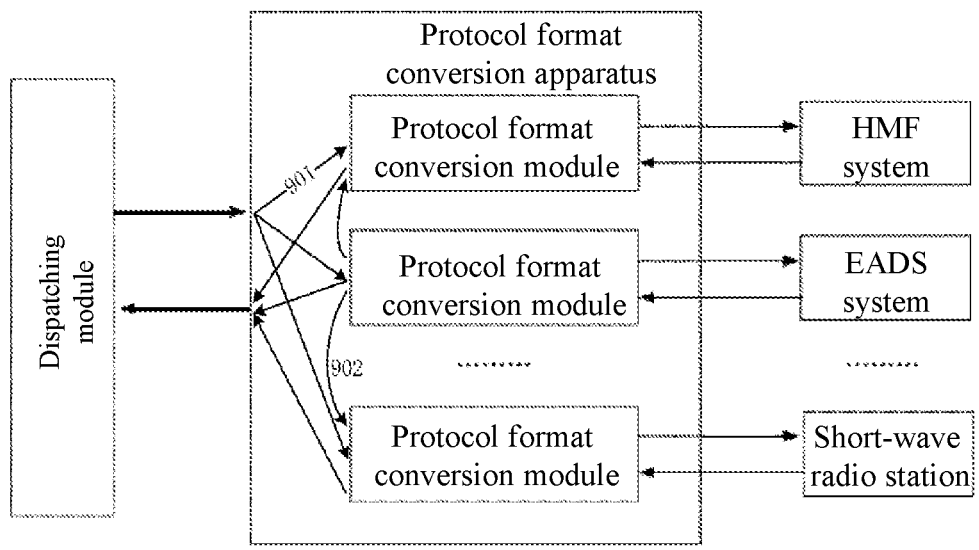
FIG. 12 is a structure diagram of a protocol format conversion apparatus according to another specific embodiment.

FIG. 12 is a structure diagram of a protocol format conversion apparatus in another application scenario. As shown in FIG. 12, the protocol format conversion apparatus only comprises multiple protocol format conversion modules associated with the access points of the wireless communication systems. It should be noted that the application scenario is not limited to the communication between one of the protocol format conversion modules and the other multiple protocol format conversion modules. FIG. 12 is merely for convenience of illustration.

When the sender is the dispatching console, the dispatching console sends the service data in conformity with the standard protocol format to each protocol format conversion module of the protocol format conversion apparatus by performing step 901. Each protocol format conversion module performs protocol format conversion on the service data separately, and then sends the converted service data to the associated access point respectively.

Since the step of distributing the service data by the uniform interface module according to the access point type is not performed, the associated access point firstly performs a data extracting operation on the converted service data which is received, and then whether the converted service data belongs to the wireless communication system is judged according to the access point type carried in the service data. If the converted service data does not belong to the wireless communication system, it is discarded. If the converted service data belongs to the wireless communication system, the remaining steps responding to the dispatching console are continued. The specific process is similar to the steps 803 to 812 shown in FIG. 11, and will not be elaborated herein.

When the sender is any access point in one of the wireless communication systems, the protocol format conversion module associated therewith converts the received service data into service data in conformity with the standard protocol format, and sends the service data in conformity with the standard protocol format to the remaining protocol format conversion modules by performing step 902. The remaining protocol format conversion modules respectively re-convert the protocol formats of the service data in conformity with the standard protocol format, and then send the re-converted service data to the associated access point that is different from the sender respectively.

Similarly, since the step of distributing the service data by the uniform interface module according to the access point type is not performed, the associated access point firstly performs a data extraction operation on the re-converted service data which is received, searches a corresponding access point type in pre-stored access point configuration information according to a receiver identification carried in the service data, and then judges whether the converted service data belongs to the wireless communication system according to the access point type obtained by searching. If the converted service data does not belong to the wireless communication system, it is discarded. If the converted service data belongs to the wireless communication system, the remaining steps responding to the sender are continued. The specific process is an inverse process of the sending process above, and will not be elaborated herein.

It should be noted that the access point configuration information is formed by being respectively send to any access point in each wireless communication system for pre-saving through the dispatching console after the dispatching console is powered on, so that the access point can learn whether the dispatching console allows mutual call among the access points belonging to different wireless communication systems. If the mutual call among the access points belonging to different wireless communication systems is allowed, then the correspondence between the receiver identification and the access point type will be stored in the pre-stored access point configuration information.

Figure 13:
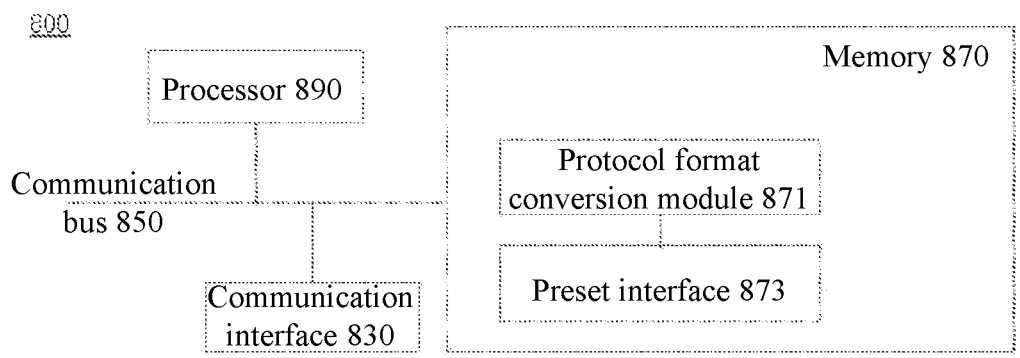
FIG. 13 is a schematic diagram of hardware constitution of an interface platform according to the present invention.

Referring to FIG. 13, in an embodiment, an interface platform 800 comprises at least one processor 890, at least one communication interface 830, at least one communication bus 850, and a memory 870.

The memory 870 is configured to store program instructions that can be executed by at least one processor 890 to implement a protocol format conversion method. The program instructions correspond to a protocol format conversion apparatus, and the apparatus may comprise a protocol format conversion module 871 and a uniform interface module 873. See the corresponding units disclosed in the above embodiments for the concrete implementation of the protocol format conversion module and the uniform interface module, which will not be elaborated herein.

The above contents are merely preferred embodiments of the present invention and are not intended to limit the embodiments of the present invention. Those skilled m the art can easily adapt or modify the present invention according to the main concept and spirit of the present invention. Therefore, the scope of protection of the invention shall be subject to the scope of protection claimed in the claims.

What is claimed is:

1. A protocol format conversion method, comprising:
   receiving, by a protocol format conversion module, service data, the service data being sent by a sender according to a preset protocol format therein, and the protocol format conversion module being associated with an access point serving as the sender or a receiver;
   performing, by the protocol format conversion module, protocol format conversion on the service data, the protocol format conversion being performed between a standard protocol format and a preset protocol format in the associated access point; and
   preprocessing sending of the converted service data, wherein:
   a uniform interface module extracts a receiver identifier from the converted service data;
   if the receiver identifier indicates that the receiver in any access point different from the sender, preprocessing sending of the converted service data comprises:
      finding an access point type in an access point configuration information according to the receiver identifier;
      distributing the converted service data to a protocol format conversion module associated with the access point, wherein the protocol format conversion module associated with the access point performs a second protocol format conversion on the converted service data; and
      sending the second converted data to the access point indicated by the access point type; and
   if the receiver identifier indicates that the receiver is a dispatching console, preprocessing sending of the converted service data comprises:
      sending the converted service data directly to the dispatching console.

2. The method according to claim 1, wherein the sender is a dispatching console, and before the step of receiving, by a protocol format conversion module, service data, the method further comprises:
   receiving, by a uniform interface module, the service data sent by the dispatching console according to the preset standard protocol format therein;
   extracting an access point type in the service data; and
   distributing the service data to the protocol format conversion module associated with the access point serving as the receiver according to the access point type.

3. The method according to claim 2, wherein the receiver is any access point, and the step of preprocessing sending of the converted service data comprises:
   sending, by the protocol format conversion module associated with the any access point, the converted service data to the any access point, the service data being in conformity with a preset protocol format in the any access point.

4. The method according to claim 1, wherein the sender is any access point, and before the step of receiving, by a protocol format conversion module, service data, the method further comprises:
   establishing a connection relation between the protocol format conversion module and the any access point, so that the protocol format conversion module is associated with the any access point; and
   distributing the service data to the protocol format conversion module associated with the any access point according to the connection relation.

5. The method according to claim 1, wherein the sender is any access point, the converted service data is in conformity with the standard protocol format, and the step of preprocessing sending of the converted service data comprises:
   sending, by the protocol format conversion module associated with the any access point, the converted service data to a uniform interface module, so that the uniform interface module forwards the service data.

6. The method according to claim 5, wherein the receiver is any access point that is different from the sender, and after the step of sending, by the protocol format conversion module associated with the any access point, the converted service data to a uniform interface module, so that the uniform interface module forwards the service data, the method further comprises:

receiving, by the uniform interface module, the converted service data, and extracting to obtain a receiver identification from the service data;

searching in access point configuration information according to the receiver identification to obtain a corresponding access point type, the access point configuration information being pre-stored in the uniform interface module after the dispatching console is powered on; and forwarding the service data to the protocol format conversion module associated with the any access point serving as the receiver according to the access point type, so that the protocol format conversion module performs protocol format conversion on the service data so as to send the re-converted service data to the receiver, the re-converted service data being in conformity with the preset protocol format in the receiver.

7. A protocol format conversion apparatus, comprising a protocol format conversion module, wherein the protocol format conversion module comprises:

a first receiving unit, configured to receive service data by the protocol format conversion module, the service data being sent by a sender according to a preset protocol format therein, and the protocol format conversion module being associated with an access point serving as the sender or a receiver;

a converting unit, configured to perform protocol format conversion on the service data by the protocol format conversion module, the protocol format conversion being performed between a standard protocol format and a preset protocol format in the associated access point; and a preprocessing unit, configured to preprocess sending of the converted service data, wherein:
a uniform interface module extracts a receiver identifier from the converted service data;
if the receiver identifier indicates that the receiver is any access point different from the sender, preprocessing sending of the converted service data comprises:
finding an access point type in an access point configuration information according to the receiver identifier,
distributing the converted service data to a protocol format conversion module associated with the access point, wherein the protocol format conversion module associated with the access point performs a second protocol format conversion on the converted service data; and
sending the second converted data to the access point indicated by the access point type; and
if the receiver identifier indicates that the receiver is a dispatching console, preprocessing sending of the converted service data comprises:
sending the converted service data directly to the dispatching console.

8. The apparatus according to claim 7, wherein the sender is a dispatching console, and the apparatus further comprises a uniform interface module, wherein the uniform interface module comprises:

a second receiving unit, configured to receive the service data sent by the dispatching console according to the preset standard protocol format therein;

an extracting unit, configured to extract an access point type in the service data; and a first distributing unit, configured to distribute the service data to the protocol format conversion module associated with the access point serving as the receiver according to the access point type.

9. The apparatus according to claim 8, wherein the receiver is any access point, and the preprocessing unit comprises:

a first sending subunit, configured to send the converted service data to the any access point by the protocol format conversion module associated with the any access point, the service data being in conformity with a preset protocol format in the any access point.

10. The apparatus according to claim 7, wherein the sender is any access point, and the protocol format conversion module further comprises:

an associating unit, configured to establish a connection relation between the protocol format conversion module and the any access point, so that the protocol format conversion module is associated with the any access point; and a second distributing unit, configured to distribute the service data to the protocol format conversion module associated with the any access point according to the connection relation.

11. The apparatus according to claim 7, wherein the sender is any access point, the converted service data is in conformity with the standard protocol format, and the preprocessing unit comprises:

a second sending subunit, configured to send the converted service data to a uniform interface module by the protocol format conversion module associated with the any access point, so that the uniform interface module forwards the service data.

12. The apparatus according to claim 11, wherein the receiver is any access point that is different from the sender, and the uniform interface module further comprises:

a third receiving unit, configured to receive the converted service data, and extract to obtain a receiver identification from the service data;

a searching unit, configured to search in access point configuration information according to the receiver identification to obtain a corresponding access point type, the access point configuration information being pre-stored in the uniform interface module after the dispatching console is powered on; and a forwarding unit, configured to forward the service data to the protocol format conversion module associated with the any access point serving as the receiver according to the access point type, so that the protocol format conversion module performs protocol format conversion on the service data so as to send the re-converted service data to the receiver, the re-converted service data being in conformity with the preset protocol format in the receiver.

13. An interface platform, comprising at least one processor, at least one communication interface, at least one communication bus, and a memory for storing program instructions, the at least one processor being configured to perform the following steps according to the program instructions:

receiving, by a protocol format conversion module, service data, the service data being sent by a sender according to a preset protocol format therein, and the protocol format conversion module being associated with an access point serving as the sender or a receiver;

performing, by the protocol format conversion module, protocol format conversion on the service data, the protocol format conversion being performed between a standard protocol format and a preset protocol format in the associated access point; and preprocessing sending of the converted service data, wherein:

a uniform interface module extracts a receiver identifier from the converted service data;

if the receiver identifier indicates that the receiver is any access point different from the sender, preprocessing sending of the converted service data comprises:

finding an access point type in an access point configuration information according to the receiver identifier, distributing the converted service data to a protocol format conversion module associated with the access point, wherein the protocol format conversion module associated with the access point performs a second protocol format conversion on the converted service data; and sending the second converted data to the access point indicated by the access point type; and if the receiver identifier indicates that the receiver is a dispatching console, preprocessing sending of the converted service data comprises:

sending the converted service data directly to the dispatching console.

14. The interface platform according to claim 13, wherein the sender is a dispatching console, and before the step of receiving, by a protocol format conversion module, service data, the processor further performs the following steps of:

receiving, by a uniform interface module, the service data sent by the dispatching console according to the preset standard protocol format therein;

extracting an access point type in the service data; and distributing the service data to the protocol format conversion module associated with the access point serving as the receiver according to the access point type.

15. The interface platform according to claim 13, wherein the sender is any access point, and before the step of receiving, by a protocol format conversion module, service data, the processor further performs the following steps of:

establishing a connection relation between the protocol format conversion module and the any access point, so that the protocol format conversion module is associated with the any access point; and distributing the service data to the protocol format conversion module associated with the any access point according to the connection relation.

16. A protocol format conversion method, comprising:

receiving, by a protocol format conversion module, service data, the service data being sent by a sender according to a preset protocol format therein, and the protocol format conversion module being associated with an access point serving as the sender or a receiver;

performing, by the protocol format conversion module, protocol format conversion on the service data, the protocol format conversion being performed between a standard protocol format and a preset protocol format in the associated access point; and preprocessing sending of the converted service data;

wherein:

if the sender is a dispatching console, the dispatching console sends the service data in conformity with the standard protocol format to each protocol format conversion module, wherein each protocol format conversion module performs protocol format conversion on the service data separately and sends the converted service data to the associated access point;

if the sender is any access point in one of the wireless communication systems, the protocol format conversion module associated therewith converts the received service data into service data in conformity with the standard protocol format and sends the service data in conformity with the standard protocol format to remaining protocol format conversion modules, wherein the remaining protocol format conversion modules respectively re-convert the protocol formats of the service data in conformity with the standard protocol format and then send the re-converted service data to the associated access point that is different from the sender.

* * * * *